United States Patent [19]
Butterworth et al.

[11] Patent Number: 6,005,722
[45] Date of Patent: Dec. 21, 1999

[54] OPTICAL DISPLAY SYSTEM INCLUDING A LIGHT VALVE

[75] Inventors: Mark M. Butterworth, Santa Clara; Laurence M. Hubby, Jr., Palo Alto, both of Calif.

[73] Assignee: Hewlett-Packard Company, Palo Alto, Calif.

[21] Appl. No.: 09/148,465

[22] Filed: Sep. 4, 1998

[51] Int. Cl.[6] .............................. G02B 3/02; G02B 27/10; G03B 21/14; G03B 21/00; H04N 9/12

[52] U.S. Cl. ...................... 359/712; 359/618; 359/891; 353/33; 353/84; 353/98; 348/742

[58] Field of Search .............................. 349/5, 7; 353/84, 353/31, 33, 37, 98; 359/618, 267, 712, 722, 723, 889, 890, 891; 348/742, 743, 744; 385/88, 133, 146

[56] References Cited

U.S. PATENT DOCUMENTS

| | | | |
|---|---|---|---|
| 5,727,108 | 3/1998 | Hed | 385/133 |
| 5,784,038 | 7/1998 | Irwin | 345/88 |
| 5,800,033 | 9/1998 | Funanami et al. | 353/97 |
| 5,805,243 | 9/1998 | Hatano et al. | 349/5 |

FOREIGN PATENT DOCUMENTS 7-081555  4/1995  Japan .

OTHER PUBLICATIONS

Applied Optics, L. Levi, Chapter 19 (Coherent Optical Systems), pp. 765–780, 1980 (Best Date Avail.).

*Primary Examiner*—Georgia Epps
*Assistant Examiner*—David N. Spector

[57] ABSTRACT

An optical display system includes a light source, a color wheel, an optical train and a light valve. The optical train includes a diffuser element, a compound parabolic concentrator and an integrator. The diffuser element diffuses incoming light to fill in holes in cone half-angle distribution of light generated by the light source. The compound parabolic concentrator reduces the cone half-angle of the diffused light to a cone half-angle expected by the light valve. The integrator reduces hot spots in the diffused light. The color wheel may modulate optical path length of light traveling through the color wheel. Modulating the optical path length reduces coherence in the light generated by the light source. A color wheel that reduces coherence would allow the light source to be laser or LED-based. If the light valve is a ferroelectric light valve, the color wheel may include pairs of polarizers. Light is polarized in orthogonal directions by the polarizers in a pair. This allows all of the light to be used by the ferroelectric light valve during dc balancing.

29 Claims, 6 Drawing Sheets

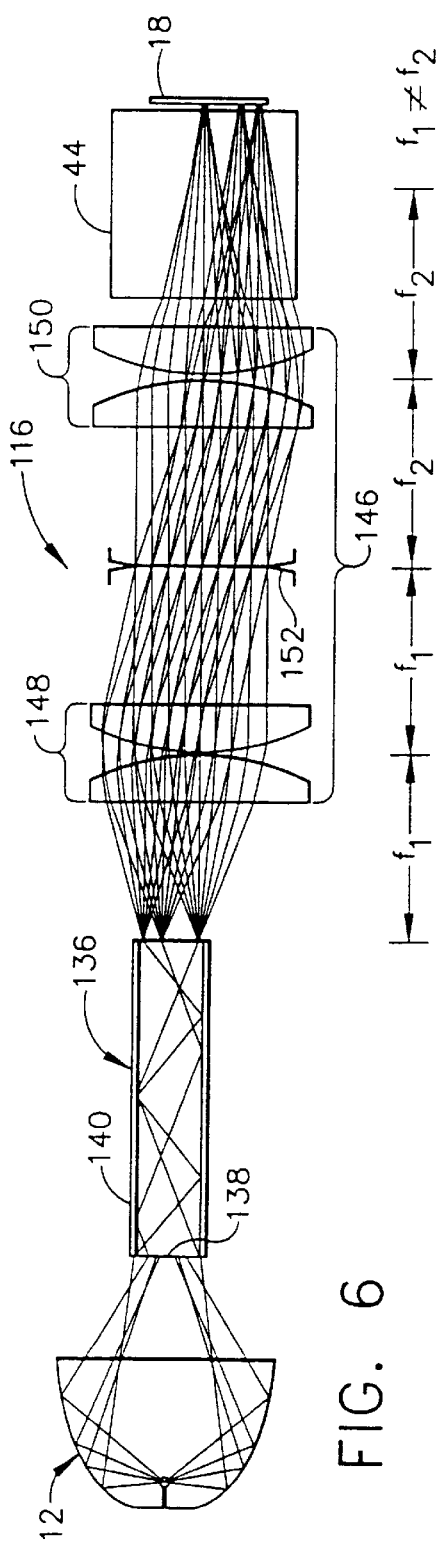
FIG. 6
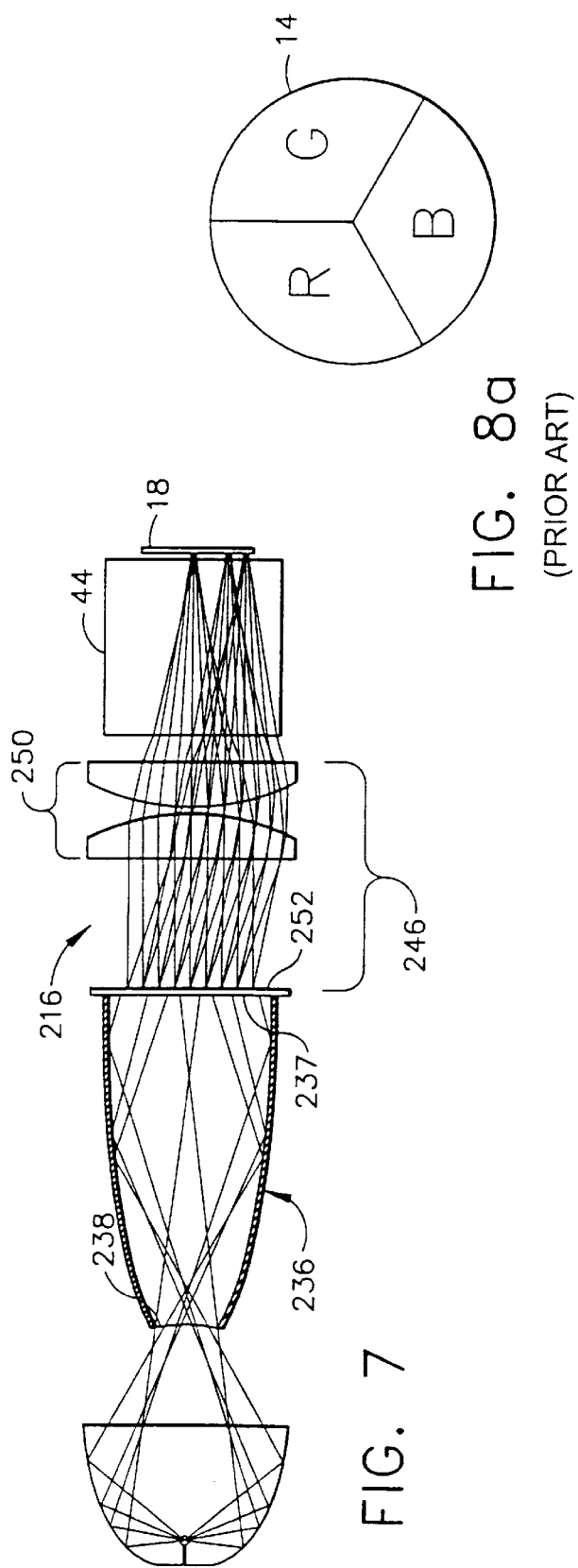
FIG. 8a (PRIOR ART)
FIG. 7

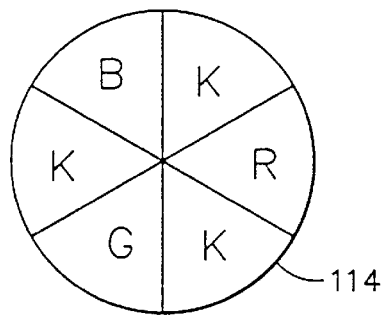
FIG. 8
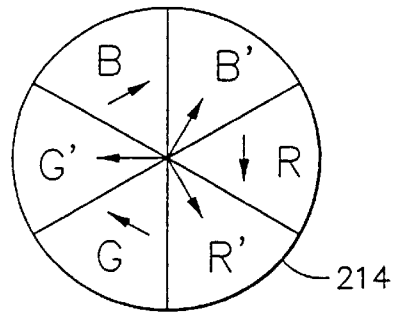
FIG. 11
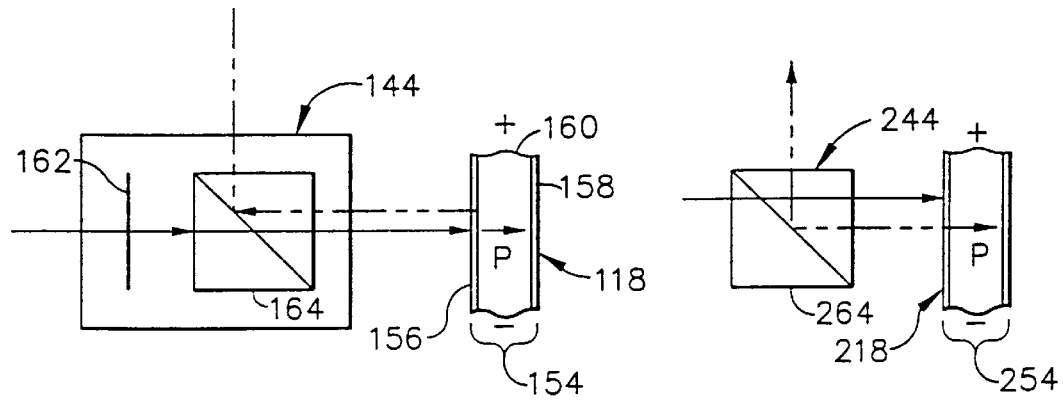
FIG. 9
FIG. 12
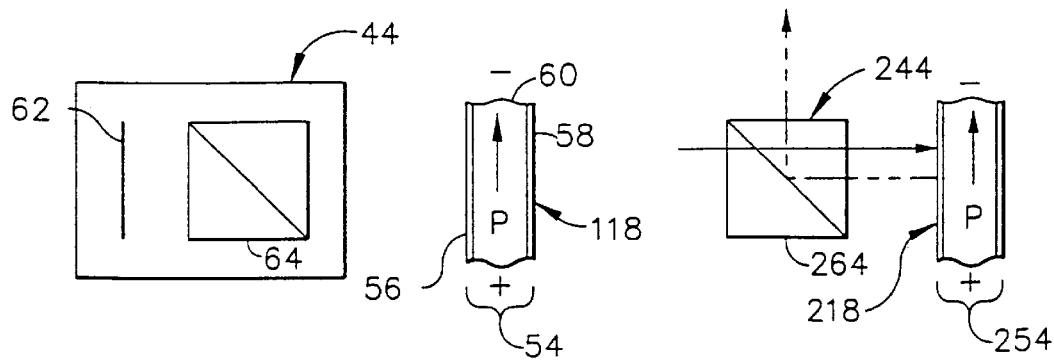
FIG. 10
FIG. 13

OPTICAL DISPLAY SYSTEM INCLUDING A LIGHT VALVE

BACKGROUND OF THE INVENTION

The present invention relates to optical display systems. More specifically, the present invention relates to an optical display system including a light valve.

High quality, multi-media computer-based presentations are becoming commonplace at meetings and conferences. Among the reasons the computer-based presentations are becoming more commonplace is the increasing affordability and quality of the projection systems that display the presentations.

A typical projection system includes a source of bright white light, a means for separating the white light into red, green and blue spectral components, and a light valve for spatially modulating each of the components. The light valve performs the spatial modulation in response to a video signal generated by the computer. Produced by the light valve are images in red, green and blue color planes. The color planes may then be recombined and projected onto a screen, or they may be flashed in sequence onto the screen at such a rate that a viewer perceives only a single image.

There are different types of light valves. For instance, there are transmissive liquid crystal light valves and reflective liquid crystal light valves. In a transmissive light valve, viewable light enters one side and exits an opposite side. In a reflective light valve, viewable light is focused onto and reflected at the same side.

Transmissive light valves are typically fabricated on glass substrates, whereas reflective light valves are typically fabricated on silicon. Silicon semiconductor technology is more established and more readily available than semiconductor-on-glass technology; therefore, the reflective light valves are less expensive to fabricate than the transmissive light valves. Finer structures such as electrodes and address lines can be fabricated on silicon; therefore, the reflective light valves can be made smaller than transmissive light valves. Reflective light valves have higher through puts and faster switching speeds than transmissive light valves. Additionally, address lines and pixel storage capacitors do not block light in reflective light valves.

There are certain problems associated with projection systems based on light valves, problems that can be attributed to the light source. A typical light source includes a reflector and an arc lamp that extends through a hole in the reflector (for example, see the amp 12 in FIG. 1). The arc lamp generates white light, and the reflector collects light rays of various cone half-angles and focuses the light into a beam.

Because of the hole, however, the reflector does not collect and reflect light rays having small cone half-angles. Only larger cone half-angles are collected and reflected. An exemplary cone half-angle distribution is indicated by the solid line A shown in FIG. 3. The distribution indicated by the line A indicates a lack of rays having cone half-angles between +10 degrees and −10 degrees. Resulting is a dark spot in the reflected light. Darks spots in the reflected light can cause dark spots in the displayed image.

Additionally, there are "hot spots" (that is, non-uniform intensity distribution) in the beam produced by the reflector. The hot spots can also cause dark spots in the displayed image.

There are other problems associated with arc lamps. Light generated by an arc lamp might have partial coherence. The partial coherence leads to a problem known as speckle, which can cause a graininess in the projected image.

Arc lamps also have a relatively short lifetime. They might burn out at inconvenient times (e.g., during presentations) and they are replaced frequently.

There exists a need to overcome the problems associated with arc lamps. Simply replacing the arc lamp with a laser will not offer a satisfactory solution because of the full coherence in the laser light. Speckle would be a much greater problem with lasers than with arc lamps.

SUMMARY OF THE INVENTION

The problems with the light source are addressed by various aspects of the present invention. The problem with the hole in the cone half-angle distribution is addressed by diffusing the light beam and then reducing the cone half-angle of the diffused light. The light may be diffused by a diffuser element or a modified input face of a light pipe. The cone half-angle may be reduced by a telecentric relay or a light pipe including a compound parabolic concentrator.

The problem with the hot spot is addressed by spatially rerandomizing the light beam. The light beam may be spatially rerandomized by a light pipe including an integrator.

The problem with the partial coherence is addressed by spatially and temporally modulating the optical path length of the light beam traveling through a color wheel. Such modulation reduces the coherence in the light beam. The optical path length may be modulated, and the coherence of the light reduced, by forming step-like variations in a rim of the color wheel. A color wheel that reduces coherence allows the arc lamp to be replaced by a white light laser or LED or a group of red, green and blue lasers or LEDs. Lasers and LEDs are far more durable than arc lamps.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 is an illustration of cone half-angle distribution before and after diffusion by the light pipes shown in FIGS. 2 and 2a;

FIG. 6 is an illustration of another optical train according to the present invention;

FIG. 7 is an illustration of yet another optical train according to the present invention;

FIG. 8a is an illustration of a conventional color wheel that may be used in the optical display system;

FIG. 8 is an illustration of a color wheel according to the present invention;

FIGS. 9 and 10 are illustrations of a beam splitter assembly that may be used in combination with the color wheel shown in FIG. 8;

FIG. 11 is an illustration of another color wheel according to the present invention;

FIGS. 12 and 13 are illustrations of a beam splitter assembly that may be used in combination with the color wheel shown in FIG. 11;

DETAILED DESCRIPTION OF THE INVENTION

Figure 1:
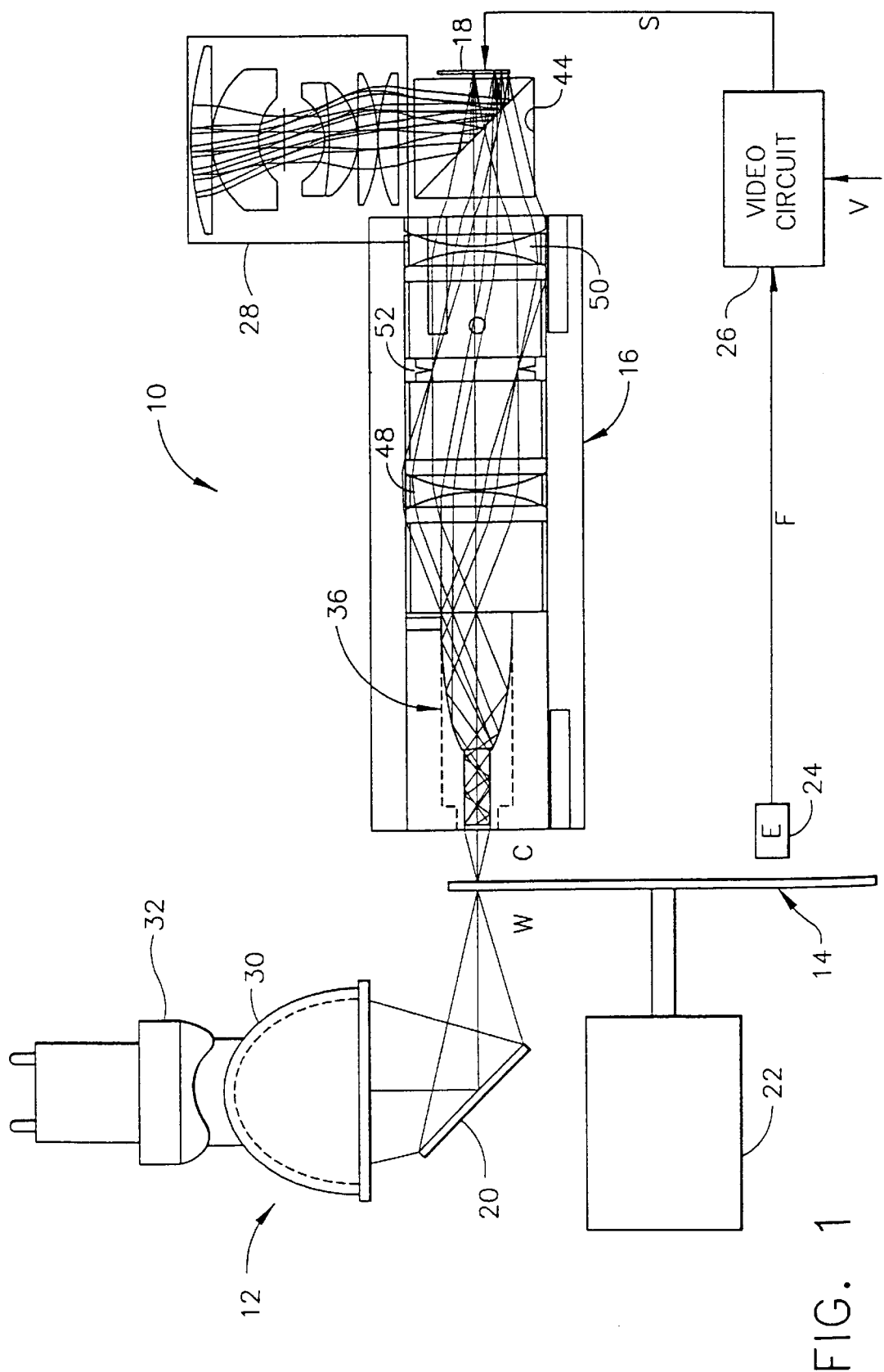
FIG. 1 is an illustration of an optical display system according to the present invention.

As shown in the drawings for purposes of illustration, the present invention is embodied in an optical display system and parts thereof, including a light source, a color wheel, an optical train and a light valve. An optical train according to the present invention can reduce or eliminate hot spots and fill in holes in cone half-angle distribution in a light beam generated by the light source. Removing the hot spots and filling in the cone half-angle holes can remove darks spots in the displayed image. A color wheel according to the present invention can reduce coherence in the light beam generated by the light source and thereby reduce graininess in the image that is displayed. The color wheel may even allow the light source to be laser or LED-based. Lasers and LEDs are far more durable than arc lamps. If the light valve is a ferroelectric light valve, another color wheel according to the present invention can make more efficient use of light during dc balancing of the ferroelectric light valve and thereby increase the amount of light used by the system. These aspects of the present invention address certain problems associated with light sources of projections systems.

FIG. 1 shows an on-axis optical display system 10 including a light source 12, a color wheel 14, an optical train 16 and a reflective light valve 18. During operation of the optical display system 10, the light source 12 generates a beam W of white light. The light source 12 includes a reflector 30 and an arc lamp 32 extending through a hole in the reflector 30. The arc lamp 32 may be a metal halide arc lamp. The reflector 30 may be an elliptical reflector that collects and focuses the arc lamp light into the white beam W. In the alternative, the arc lamp light may be collected and focused into the white beam W by a combination of a parabolic reflector and a lens.

Figure 3:
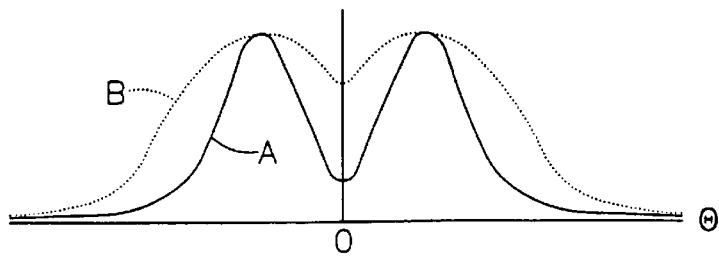

Cone half-angle of the light collected by reflector 30 is specific to the design of the reflector 30. For example, the cone half-angle distribution might have a maximum/minimum cone half-angle θ of about ±30 degrees and, due to the arc lamp aperture, the cone half-angle distribution might have a hole in the range of −10<θ<+10 degrees. Such a cone half-angle distribution is indicated by the solid line A shown in FIG. 3.

The intensity of the white beam W leaving the reflector 30 is not uniform either. The white beam W might have hot spots.

A flat mirror 20 directs the white beam W through the color wheel 14, which is rotated by a motor 22. The color wheel 14 includes red, green and blue filters R, G and B (see FIG. 8a). When the red filter R is moved in front of the beam reflected off the flat mirror 20, only the red component of the white beam W is passed by the color wheel 14. When the green filter G is moved in front of the beam reflected off the flat mirror 20, only the green component of the white beam W is passed. When the blue filter B is moved in front of the beam reflected off the flat mirror 20, only the blue component of the white beam W is passed.

Thus, the color wheel 14 filters the white beam W to produce a color beam C that changes colors from red to blue to green to red to blue to green, and so on at a rate that is proportional to the angular rotation rate of the color wheel 14. The motor 24 may rotate the color wheel 14 at a speed of 3600 rpm, which produces a 60 Hz frame rate. The human eye does not discern the flashing light pattern of the color beam C.

An optical encoder 24 detects position of the color wheel 14 and generates a signal F indicating the wheel position. The encoder signal F is processed to determine when the color beam C is red (that is, when the red filter is in front of the white beam W), when it is blue, and when it is green.

The optical train 16 receives the color beam C and focuses the color beam C onto a light-receiving surface of the light valve 18. The optical train 16 also changes the cone half-angle of the color beam C to a cone half-angle expected by the light valve 18. Typically, the cone half-angle of the white beam W generated by the light source 12 (and, therefore, the cone half-angle of the color beam C) will be greater than the cone half-angle expected by the light valve 18. Additionally, the optical train 16 reduces hot spots in the color beam C. The optical train 16 also fills in any holes in the cone half-angle distribution of the color beam C.

A video circuit 26 receives a video signal V from a host (e.g., a notebook computer, a desktop computer). The video signal V carries red, green and blue components of an image to be displayed. The video circuit 26 processes the encoder signal F to determine whether red, blue or green light is being focused onto the light valve 18, and generates a control signal S that causes the light valve 18 to spatially modulate the color beam C. When the color beam C is red, for instance, the light valve 18 modulates the color beam C according to the red component of the image to be displayed. Reflected by the light valve 18 are red, green and blue components of the image to be displayed. The components are serially multiplexed in the light reflected by the light valve 18.

The light reflected from light valve 18 is received by the optical train 16. The optical train 16 directs the reflected light to a projections lens 28.

Design of the projection lens 28 will depend upon the intended use of the system 10. If the optical display system 10 is used in a large screen projection system, the projection lens 28 will be designed to form an image onto a large remote screen. If the optical system 10 is used in a computer monitor or television, the projection lens 28 will be designed to form an image on a proximately-located glass or plastic rear projection screen.

Figure 2:
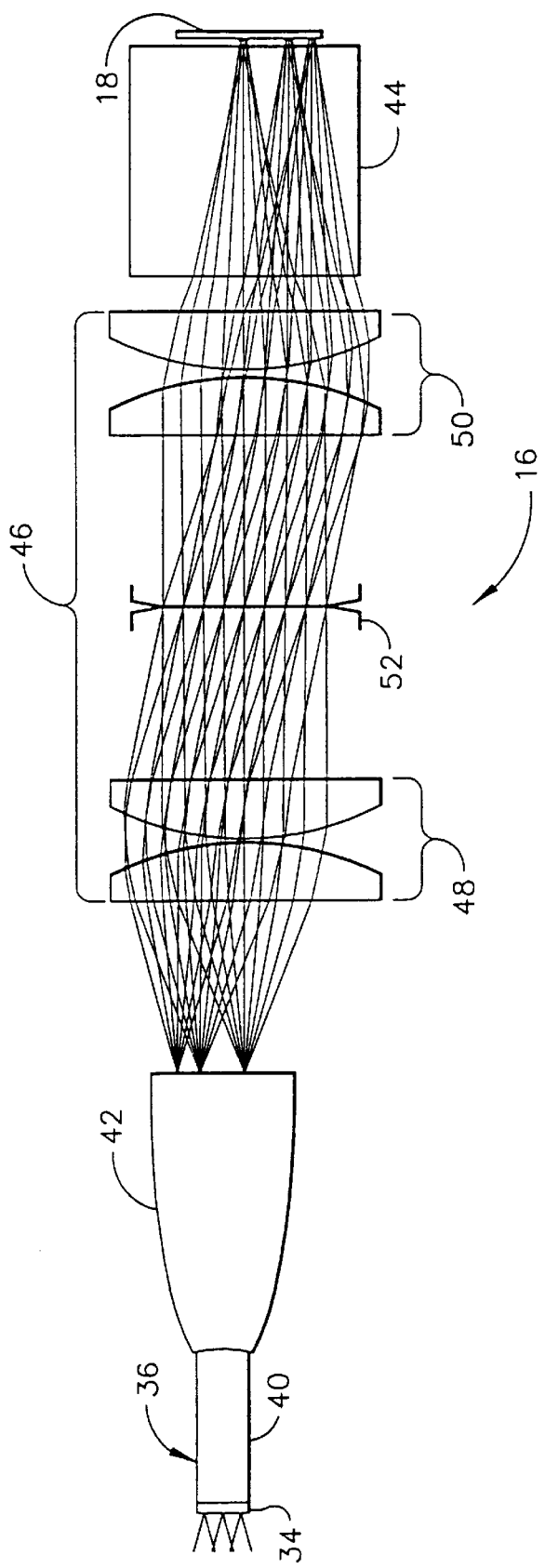
FIG. 2 is an illustration of an optical train according to the present invention, the optical train including a light pipe.

Referring now to FIG. 2, the optical train 16 includes a diffuser element 34 and a light pipe 36. The rays entering the diffuser element 34 are redirected randomly and exit the diffuser element 34 at slightly larger or smaller cone half-angles than which they entered. For example, the color beam C has a cone half-angle distribution indicated by the solid line A shown in FIG. 3, and the diffuser element 34 changes the cone half-angles of the rays by an angle Δθ of ten degrees. Some of the rays exiting the diffuser element 34 will have cone half-angles between +10 and −10 degrees.

Additionally, some of the rays exiting the diffuser element 34 will have cone half-angles as high as +40 and −40 degrees. Resulting might be a cone half-angle distribution indicated by the dashed line B in FIG. 3. The dashed line B shown in FIG. 3 still does not indicate a uniform cone half-angle distribution between +10 and −10 degrees; there is still a valley at θ=0 degrees. However, the hole in the distribution has been filled in. A more uniform distribution could be obtained by increasing the amount of diffusion by the diffuser element 34. The diffuser element 34 may be made of ground glass or plastic, it may be a holographic diffuser, etc.

Figure 2B:
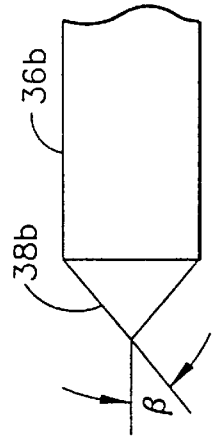
FIG. 2b is an illustration of a portion of yet another light pipe according to the present invention.
Figure 2A:
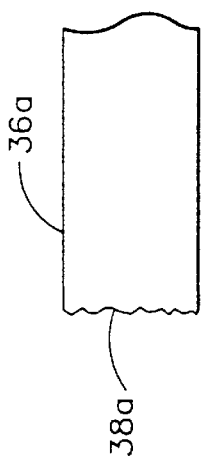
FIG. 2a is an illustration of a portion of another light pipe according to the present invention.

In the alternative, the diffuser element 34 may be eliminated and an input face 38a of the light pipe 36a may be modified to diffuse and randomize the incoming rays and thereby fill in the hole in the cone half-angle distribution (see FIG. 2a). The input face 38a of the light pipe 36a may be modified by roughening it with sandpaper, it may be modified by etching a diffraction grating, or it may be modified by embossing, engraving or molding a texture.

Figure 4:
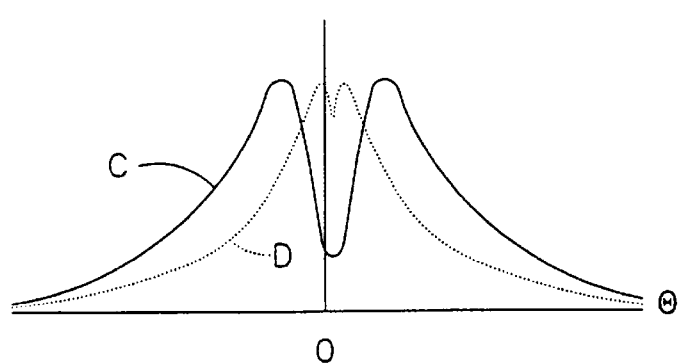
FIG. 4 is an illustration of cone half-angle distribution before and after diffusion by the light pipe shown in FIG. 2b.

The input face 38b of the light pipe 38b may instead be modified by beveling it into the shape of an axicon (see FIG. 2b). The angle β of the axicon will modify the incoming ray angle in accordance with Snell's Law of Refraction. The axicon functions as a prism and produces two profiles that are shifted by an amount that is dependent upon the axicon angle β. Resulting are two shifted cone half-angle distributions C and D, the sum of which fills in the distribution hole between +10 and −10 degrees (see FIG. 4). An exemplary axicon angle β is 80 degrees.

The light pipe 36 includes a kaleidoscope integrator 40 for reducing hot spots in the color beam C. The integrator 40 may be a clear rod having straight walls. Internal reflections cause the color beam C to bounce around the walls and the intensity to become evened out. The integrator 40 may have a length that allows the color beam C to be reflected at least three times. Longer integrator lengths will create greater uniformity in the light intensity, but might cause attenuation of the light.

The integrator 40 may be made of an optical material such as clear glass, clear polycarbonate or clear plastic. The integrator 40 may be hollow or solid. A hollow integrator may be coated on the inside with a metal such as aluminum to provide a reflective layer. The hollow integrator can accept a wider range of cone half-angles than a solid integrator.

Figure 5:
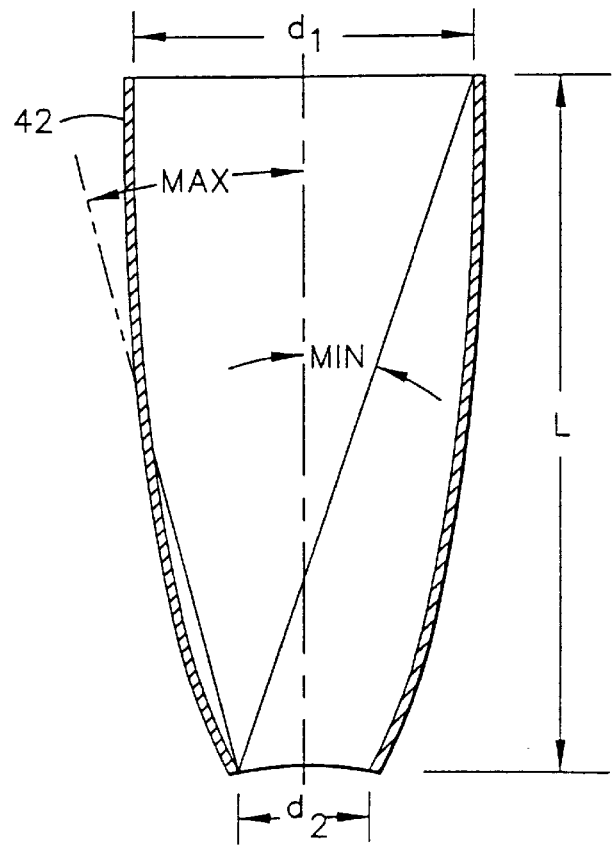
FIG. 5 is an illustration of a compound parabolic concentrator of the optical train shown in FIG. 2.

The light pipe 36 further includes a compound parabolic concentrator ("CPC") 42. The CPC 42 changes the cone half-angle of incoming light to the cone half-angle expected by the light valve 18. Compound parabolic concentrators in general are well known. See, for instance, Roland Winston U.S. Pat. Nos. 3,923,281; 4,002,499; 4,003,638; and 4,387,961. According to these patents, a compound parabolic concentrator in general includes an energy receiver positioned between two trough-like sidewalls that reflect substantially all incident energy received over a predetermined angle onto the energy receiver. The profile curves of at least portions of the reflective sidewalls are concavely shaped consistent with reflecting maximum energy rays onto the energy receiver. FIG. 5 illustrates an exemplary CPC 42 having a curve shape of an off-axis tilted parabola. Information provided in W. T. Welford and R. Winston "High Collection Nonimaging Optics" (Academic Press, 1989) may be used to determine parameters (e.g., d1, d2, L, max, min) of the CPC 42.

The CPC 42 may also be made of a material such as a clear glass, clear polycarbonate or a clear plastic. The CPC 42 may be hollow or solid. A hollow CPC 42 may be coated on the inside with a metal such as aluminum. As with the hollow integrator, the hollow CPC will accept a greater range of cone half-angles that a solid CPC.

The integrator 40 and the CPC 42 may be formed integrally or fabricated separately and secured together. The cross section of the light pipe 36 may be circular or rectangular, or it may have a different geometry. However, light might be wasted if the cross-section of the light pipe 36 is not matched with the shape of the light valve 18.

Light leaving the light pipe 36 eventually reaches a beam splitter assembly 44. The beam splitter assembly 44 transmits incoming light to the light-receiving surface of the light valve 18 and directs light reflected by the light valve 18 towards the projections lens 28.

Light cones are normal to the light-receiving surface of the light valve 18. That is the light focused onto light valve 18 is telecentric. Telecentricity is preferred, but not required. In a telecentric system, the light reflected by the light valve 18 is also telecentric, and the light directed towards the projection lens 28 is telecentric.

Additionally, the light leaving the light pipe 36 is telecentric, and the light entering the beam splitter assembly 44 is telecentric. The diameter of the telecentric beam leaving the light pipe 36 has a tendency to increase over distance. This distance is increased by the beam splitter assembly 44. If the diameter becomes too large, not all of the color beam C will be usable by the light valve 18. Consequently, precious light will be wasted.

Therefore, a telecentric relay 46 is used to image the telecentric output of the CPC 42 onto the light valve 18 such that the size of the image leaving the light pipe 36 is the same size as the image focused onto the light valve 18. The telecentric relay 46 may have a conventional construction such as first and second lens groups 48 and 50 separated by an aperture stop 52. Each lens group 48 and 50 may include one or more spherical or aspherical lenses (two spherical lenses are shown for each group 48 and 50). The speed of the telecentric relay 46 depends upon the application for which the optical display system 10 is intended. For example, the telecentric relay 46 might have a speed of f1.4 in a projection system.

The telecentric relay shown in FIG. 2 has a 1:1 ratio of focal length f1 of the first lens group 48 to focal length f2 of the second lens group 50. Thus, the cone half-angle of the light entering the telecentric relay 46 has the same cone half-angle as the light leaving the telecentric relay 46.

However, the telecentric relay 46 may be used to change the cone half-angle of the incoming light.

FIG. 6 shows an optical train 116 in which the telecentric relay 146 changes the cone half-angle (the flat mirror 20 has been omitted merely for clarity). The telecentric relay 146 can change the cone half-angle according to the relative focal lengths f1 and f2 of the two lens groups 148 and 150. If the focal lengths f1 and f2 are not equal, the cone half-angle will be increased or decreased. For example, an f1.4 telecentric relay 146 can change the cone half-angle of the light exiting the light source 12 from 35 30 degrees to ±21 degrees.

Additionally, the light pipe 136 of the optical train 116 includes only the integrator 140. An input face 138 of the integrator is modified to diffuse and randomize the incoming light.

FIG. 7 shows yet another optical train 216 according to the present invention. The light pipe 236 includes only a CPC 242. An input face 238 of the CPC 242 is modified to diffuse and randomize incoming light rays. An output face 237 of the CPC 242 goes directly to the aperture stop 252. The output face 237 of the CPC 242 matches the aperture in the aperture stop 252. This allows the first lens group to be eliminated. Light passing through the aperture stop 252 is focused onto the light valve 18. Thus, the length of the telecentric relay 246 is reduced from four focal lengths to two focal lengths.

Hot spots could be corrected by a means other than the integrator 40, and cone half-angle could be changed by means other than the CPC 42. However, the combination of the integrator 40 and the CPC 42 can correct hot spots and fill in cone half-angle distribution holes in a single, compact, yet inexpensive package. Additionally, using the CPC 42 to change cone half-angle allows either a 1:1 telecentric relay 46 to be used or a telecentric relay 246 having only a second optical lens group 250.

The optical display system 10 may use Critical illumination instead of Kohler illumination. Thus, the image of the arc lamp 30 may be focused at the light-receiving surface of the light valve 18 instead of an entrance pupil of the projection lens 28. Critical illumination can capture more light than Kohler illumination. Because the optical display system 10 is telecentric, critical illumination may be easier to implement.

Reference is now made to FIG. 8, which shows a color wheel 114 for an optical display system including a ferroelectric light valve. The color wheel 114 includes red, green and blue color filters R, G, B separated by three blackened zones K. The color wheel 14 may be made of a thin plastic that is colored according to the pattern shown in FIG. 8.

When the red filter R is moved in front of the beam reflected off the flat mirror 20, only the red component of the white beam W is passed. When the green filter G is moved in front of the beam reflected off the flat mirror 20, only the green component of the white beam W is passed. When the blue filter B is moved in front of the beam reflected off the flat mirror 20, only the blue component of the white beam W is passed. When one of the black zones K is moved in front of the beam reflected off the flat mirror 20, no light passes through the color wheel 14. Thus, rotating the color wheel 114 at a relatively constant angular rate still produces a color beam C having a red, blue, green, red, blue, green pattern, except that the color beam C includes gaps in the pattern.

Because the optical encoder 24 provides wheel position information to the video circuit 26, the video circuit 26 can determine the positions of the dark zones K relative to the path of the white beam W. Armed with this information, the video circuit 26 can cause the motor 22 to adjust the position of the color wheel 114 to block the white beam W during dc balancing of the ferroelectric light valve.

Reference is now made to FIGS. 9 and 10, which illustrate a beam splitter assembly 144 and a typical pixel 154 of a ferroelectric reflective light valve 118. Light that enters the beam splitter assembly 144 is polarized by a polarizer 162 and transmitted by a beam splitter 164.

During forward operation of the ferroelectric light valve 118 (See FIG. 9), a voltage is applied to first and second electrodes 156 and 158 of the light valve 118. The voltage causes a ferroelectric liquid crystal material 160 (between the electrodes 156 and 158) to be polarized in the same direction as the light beam leaving the polarizer 162. Light transmitted by the beam splitter 164 is further transmitted by the first electrode 156 and the liquid crystal material 160.

The liquid crystal material 160 partially rotates the light. The partially rotated light is reflected by the second electrode 158, transmitted again by the liquid crystal material 160 (and partially rotated again), and transmitted again by the first electrode 156. The reflected light is shown in dashed lines. The polarized reflected light, now out of phase, is reflected towards the projection lens 28 by the beam splitter 164. Pulse width modulating the voltage across the electrodes 156 and 158 controls the intensity of the light reflected by the second electrode 158.

During forward operation of the ferroelectric light valve 118, however, charges tend to migrate from one electrode to the other electrode. To prevent this migration from happening, polarity of the voltage applied to the first electrode 156 is reversed such that the electrical field across the electrodes 156 and 158 has a net zero charge. During this charge reversal period, known as dc or dark balancing, the light valve 118 is not useable since the polarity of the liquid crystal material is now orthogonal (see FIG. 10). The white beam W is blocked by the black zones K of the color wheel 14 during dc balancing.

Because the black zones K of the color wheel 14 are blocking the light during dc balancing, all of the light supplied by the arc lamp 12 is not used. Consequently, precious light is wasted.

FIG. 11 shows a modified color wheel 214 that allows all of the light supplied by the arc lamp 12 to be used by the ferroelectric light valve. The modified color wheel 214 includes three pairs of polarizers: two red polarizers R and R', two green polarizers G and G', and two blue polarizers B and B'. The polarizers of each pair are adjacent (e.g., the first blue polarizer B is next to the second blue polarizer B'); and their polarities are orthogonal (e.g., the polarity of the first red polarizer is orthogonal to the polarity of the second red polarizer R').

The polarizers R, R', G, G', B and B' may be mounted to a disc-like substrate. The substrate may be made of a clear glass, clear plastic or other clear optical material. The polarizers R, R', G, G', B and B' may be secured to the disc-like substrate by means such as optical cement.

Additional reference is now made to FIGS. 12 and 13. Because the three pairs of polarizers R, R', G, G', B and B' are located on the color wheel 214, a polarizer is not needed in the beam splitter assembly 244. Thus, the beam splitter assembly 244 includes only a beam splitter 264.

During forward operation of the ferroelectric light valve 218, the white beam is filtered and polarized in one direction by one of the polarizers R, G or B (see FIG. 12). Light is transmitted by the beam splitter 264 to the light valve 218. Light that is reflected by the light valve 218 during the forward operation is further reflected by the beam splitter 264 towards the projection lens 28.

During dc balancing of the ferroelectric light valve 218, the white beam is filtered and polarized in an orthogonal direction by one of the other polarizers R', G' or B' (see FIG. 13). Light is transmitted by the beam splitter 264 to the light valve 118. Light that is reflected by the light valve 218 during the dc balancing is further reflected by the beam splitter 264 towards the projection lens 28. The reflected light is shown in dashed lines.

Thus, the modified color wheel 214 allows more light to be used than the color wheel 114 having the black zones K. Moreover, the beam splitter assembly 244 used in combination with the modified color wheel 214 has one less polarizer than the beam splitter assembly 44 used in combination with the color wheel 114 having the black zones K.

Figure 14:
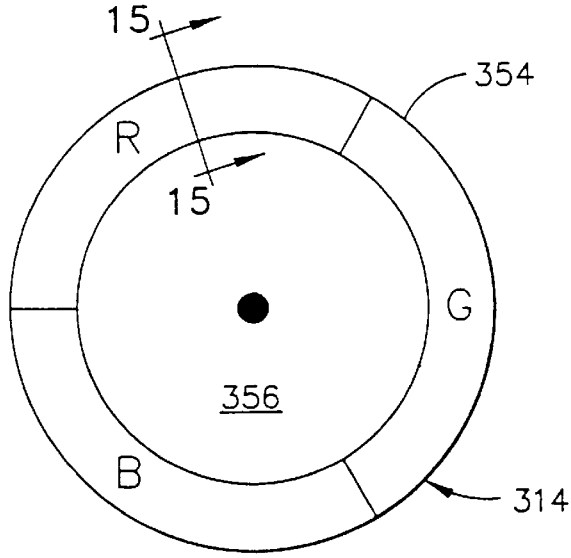
FIG. 14 is an illustration of yet another color wheel that may be used in the optical display system.
Figure 15:
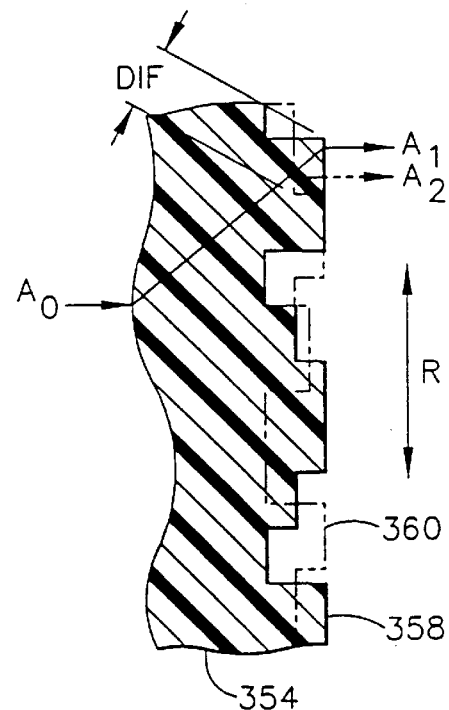
FIG. 15 is an illustration of a cross-section of the color wheel shown in FIG. 14.

FIGS. 14 and 15 show a color wheel 314 (hereinafter, the "variable-thickness color wheel 314") which may be used in an optical display system including any type of light valve. The variable thickness color wheel 314 includes an inner wheel 356 and a rim 354 surrounding the inner wheel 356. The inner wheel 356 may be made of a material such as aluminum. An exemplary radius of the inner wheel 356 is about two inches, and an exemplary outer radius of the rim 354 is about two and one-half inches. Thickness of the rim 354 may be about one-sixteenth of an inch, while thickness of the inner wheel 356 may be about one-eighth of an inch. The white beam W is directed into the rim 354.

The rim 354 includes red, green and blue filters R, G and B for filtering the white beam W. The rim 354 also has step-like variations in thickness in both the radial and circumferential directions. The variable thickness may be created by forming a molded pattern or a holographic element in the rim 354. The pattern is random.

As a result of the step-like variations in rim thickness, the optical path length of the white beam traveling through the rim 354 is modulated as the variable thickness color wheel 314 is rotated. Optical path length modulation is illustrated by FIG. 15. Steps 358 shown in solid lines correspond to a first position of the color wheel 314. Steps 360 shown in phantom correspond to a second position of the color wheel 314. A light ray A0 enters one side of the color wheel 314. When the color wheel is at the first position, a light ray A1 exits from one of the steps 358 shown in solid lines. When the color wheel 314 is rotated to the second position, a light ray A2 exits through one of the steps 360 shown in phantom. The change (dif) in optical path length that the ray travels through the rim 354 will reduce the coherence in the color beam C.

Moreover, the step-like variations in thickness occur in a radial direction. The radial direction is indicated by an arrow R. The change in optical path length in the radial direction will also reduce the coherence in the color beam C.

The light is modulated over the visible spectrum (380 nm to 700 nm). The change (dif) in optical path length might be N wavelengths of the light being filtered, where N is a positive integer. For example, the change in optical path might be 10 or 11 wavelengths.

The variations in thickness may be on the entrance side of the rim 354 or the exit side of the rim 354. FIG. 15 happens to show thickness variations on the exit side of the rim 354.

Thus, the variable thickness color wheel 314 reduces the partial coherence in the beam generated by the arc lamp 32. The variable thickness color wheel 314 could even reduce the coherence in a laser or LED-based light source. This would allow one or more lasers or LEDs to be used in place of an arc lamp 32.

Figure 16:
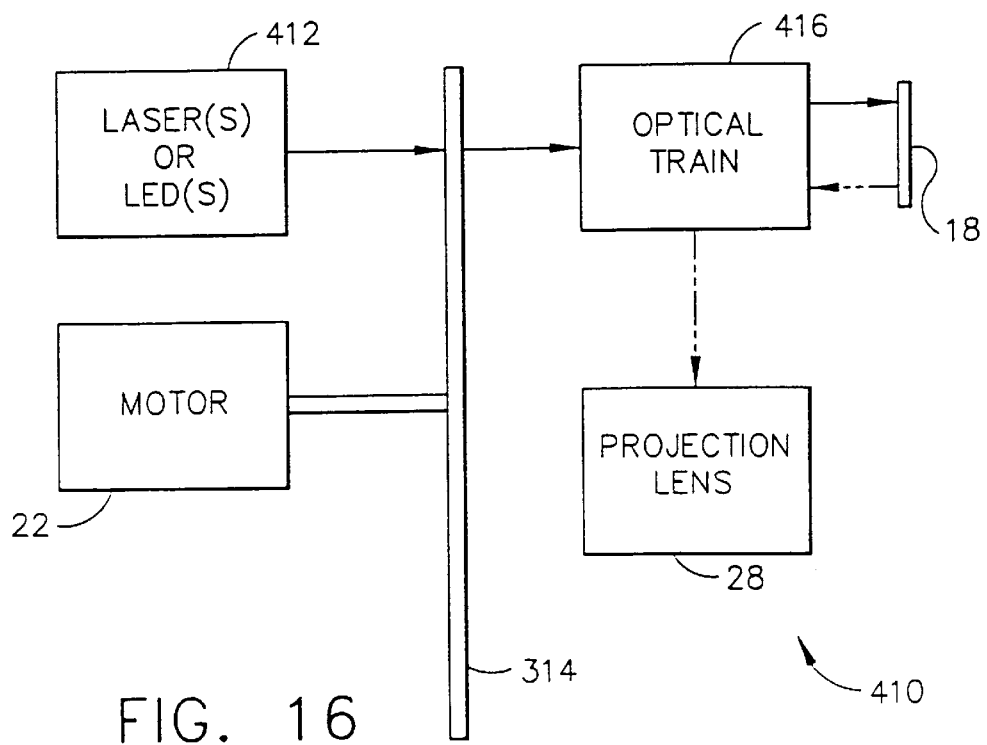
FIG. 16 is an illustration of an optical display system including a laser-based source of light and the color wheel shown in FIGS. 14 and 15.

FIG. 16 shows a laser or LED-based optical system 410. A laser or LED 412 generates a white beam. The variable-thickness color wheel 314 separates the white beam into color components. The variable-thickness color wheel 314 also destroys the coherence in the beam and thereby reduces speckle. An advantage of such a system 410 is that lasers and LEDs last much longer than arc lamps. Additionally, the beams generated by the laser(s) and LED(s) do not have holes in the cone half-angle distribution. Any hot spots in the laser or LED beam could be corrected by an integrator of the optical train 416.

Instead of using a white light laser or LED, the system 416 could include three separate lasers or LEDs for generating three separate beams of red, green and blue light. In this case, the rim 354 of the variable thickness color wheel would be made of a clear material. The rim 354 would not filter the three beams, it would only reduce the coherence.

Thus disclosed is an optical display system including a light pipe that reduces or eliminates hot spots and fills in holes in cone half-angle distributions and thereby removes dark spots from the image being displayed. The optical display system may also include a color wheel that reduces coherence in the light beam and thereby reduces graininess in the image that is displayed. Such a color wheel may even allow the light source to be a laser or LED. Lasers and LEDs are far more durable than arc lamps. If the optical display system includes a ferroelectric light valve, the color wheel may be modified to make more efficient use of light during dc balancing of the light valve and thereby increase the amount of light used by the system.

These aspects of the present invention facilitate the use of reflective liquid crystal light valves. Reflective light valves are smaller and less expensive than transmissive liquid crystal light valves. The lower cost of the reflective liquid crystal light valves is a particular advantage for optical display systems that are used in a mass production items. However, these modifications can also be applied to systems including other types of light valves.

Applications for optical display systems according to the present invention include projection systems. Other applications include television sets and computer monitors. A television set or computer monitor including an optical display system according to the present invention would be much lighter than a television set or computer monitor including a cathode ray tube. The television set or computer monitor including the optical display system according to the present invention would also have a smaller footprint. The size differential would become significant with increases in the viewing area.

The invention is not limited to the specific embodiments described and illustrated above. For example, either the CPC or the light integrator may receive light first. If the CPC receives incoming light first, its input face may be modified to diffuse the incoming light.

If the output face of the light pipe can be located close enough to the light valve such that the telecentric light beam diameter does not does become too large, the telecentric relay may be eliminated. If the telecentric relay is eliminated, a CPC would adjust the cone half-angle.

Instead of using a color wheel, dichroic mirrors could be used for separating the white light from the source into red and blue and the green components.

Although the optical display system was described in connection with a reflective liquid crystal light valve, it is not so limited. The invention could be used with a transmissive liquid crystal light valve, a digital micromachined mirror light valve, a diffraction grating-type light valve, etc.

Accordingly, the invention is not limited to the specific embodiments described and illustrated above. Instead, the invention is construed according to the claims that follow.

What is claimed is:

1. An optical display system comprising:
   a light source;
   at least one light valve; and
   an optical train in optical communication with the light source and at least one light valve, the optical train including a light pipe, the light pipe including a compound parabolic concentrator.

2. The system of claim 1, wherein the optical train further includes a 1:1 telecentric relay in optical communication with the light valve and the compound parabolic concentrator, the compound parabolic concentrator being designed to change cone half-angle of incoming light.

3. The system of claim 1, wherein the light pipe further includes an integrator.

4. The system of claim 1, wherein the optical train further includes a diffuser element in front of the light pipe for filling in cone half-angles in light generated by the light source.

5. The system of claim 3, wherein an input face of the light pipe can diffuse incoming light to fill in cone half-angles in light generated by the light source.

6. The system of claim 5, wherein the input face is roughened.

7. The system of claim 5, wherein the input face is axicon-shaped.

8. The system of claim 1, wherein the compound parabolic concentrator has an output face, and wherein the optical train further includes a telecentric relay between the light valve and the compound parabolic concentrator, the telecentric relay having an aperture stop opposing the output face of the compound parabolic concentrator, the telecentric relay further including a lens group between the aperture stop and the light valve.

9. The system of claim 1, further comprising a rotatable color wheel disposed in an optical path between the light source and the optical train, a portion of the color wheel having a variable thickness for modulating optical path length.

10. The system of claim 9, wherein the light source includes at least one laser.

11. The system of claim 9, wherein the light source includes at least one LED.

12. The system of claim 1, wherein at least one light valve is a ferroelectric light valve, and wherein the color wheel has at least one pair of first and second polarizers, the first and second polarizers in each pair being adjacent, the polarities of the first and second polarizers in each pair being orthogonal.

13. The system of claim 1, wherein at least one light valve is a ferroelectric light valve, and wherein the color wheel includes red, green and blue filters separated by dark zones.

14. An optical display system comprising:
a light valve;
a source of white light;
means for splitting the white light into spectral components of the white light; and
an optical train between the splitting means and the light valve, the optical train including a compound parabolic concentrator for changing cone half-angle of light received from the splitting means.

15. An optical train for an optical display system, the optical train comprising:
a light pipe including compound parabolic concentrator for reducing cone half-angle of incoming light; and
a telecentric lens for imaging an output of the light pipe onto an imaging plane of the optical display system.

16. A light pipe of an optical train for an optical display system, the light pipe comprising:
a compound parabolic concentrator for reducing cone half-angle of the incoming light; and
an integrator for reducing hot spots in the incoming light;
one of the integrator and the compound parabolic concentrator having an input face, the input face being adapted to diffuse incoming light;
the other of the integrator and the compound parabolic concentrator having an output face of the light pipe.

17. An optical display system comprising:
a light valve;
means for generating a beam of light;
a rotatable wheel including a region having a variable thickness for modulating optical path length that the light beam travels through the region, the modulation of the optical path length reducing the coherence in the beam; and
an optical train for imaging the color beam onto a light receiving surface of the light valve.

18. A color wheel for reducing coherence in a light beam in an optical display system, the color wheel comprising a region having a variable thickness for modulating optical path length that the light beam travels through the region, the modulation of the optical path length reducing the coherence in the beam.

19. An optical display system comprising:
a ferroelectric light valve;
means for generating a beam of white light;
a rotatable color wheel for filtering the white beam to produce a color beam, the color wheel including pairs of red, green and blue filters, each filter pair including first and second polarizers, the first and second polarizers in each pair being adjacent, the polarities of the first and second polarizers in each pair being orthogonal; and
an optical train for imaging the color beam onto a light receiving surface of the light valve.

20. A color wheel for an optical display system, the color wheel comprising pairs of red, green and blue filters, each filter pair including first and second polarizers, the first and second polarizers in each pair being adjacent, the polarities of the first and second polarizers in each pair being orthogonal.

21. An optical display system comprising:
a ferroelectric light valve;
means for generating a beam of white light;
a rotatable color wheel for filtering the white beam to produce a color beam, the color wheel including pairs of red, green and blue filters separated by dark zones; and
an optical train for imaging the color beam onto a light receiving surface of the light valve;
wherein the dark zones of the color wheel block the beam during dc balancing of the ferroelectric light valve.

22. The optical train of claim 15, wherein the light pipe further includes an integrator.

23. The optical train of claim 15, further comprising a diffuser element in front of the light pipe for filling in cone half-angles in light generated by the light source.

24. The optical train of claim 15, wherein an input face of the light pipe can diffuse incoming light to fill in cone half-angles in light generated by the light source.

25. The optical train of claim 24, wherein the input face is roughened.

26. The optical train of claim 24, wherein the input face is axicon-shaped.

27. The optical train of claim 15, wherein the compound parabolic concentrator has an output face, and wherein the telecentric relay has an aperture stop opposing the output face of the compound parabolic concentrator, the telecentric relay further including a lens group between the aperture stop and the light valve.

28. The color wheel of claim 18, wherein the region has step-like variations in radial and circumferential directions.

29. The color wheel of claim 19, wherein the first polarizers filter the light during forward operation of the light valve, and wherein the second polarizers filter the light during dc balancing of the light valve.

* * * * *